(12) United States Patent
Mishima et al.

(10) Patent No.: US 10,800,474 B2
(45) Date of Patent: Oct. 13, 2020

(54) FASTENER AND WIRING ASSEMBLY INCLUDING FASTENER

(71) Applicant: Shimano Inc., Sakai-shi, Osaka (JP)

(72) Inventors: Eiji Mishima, Sakai (JP); Takafumi Suzuki, Sakai (JP); Junya Fujita, Sakai (JP)

(73) Assignee: Shimano Inc., Sakai-shi, Osaka (JP)

( * ) Notice: Subject to any disclaimer, the term of this patent is extended or adjusted under 35 U.S.C. 154(b) by 0 days.

(21) Appl. No.: 16/048,771

(22) Filed: Jul. 30, 2018

(65) Prior Publication Data

US 2019/0061856 A1 Feb. 28, 2019

(30) Foreign Application Priority Data

Aug. 31, 2017 (JP) .................................. 2017-167029

(51) Int. Cl.
*H01R 4/32* (2006.01)
*B62J 11/00* (2020.01)
(Continued)

(52) U.S. Cl.
CPC .............. *B62J 11/00* (2013.01); *B62K 19/40* (2013.01); *B62M 25/08* (2013.01); *F16B 35/041* (2013.01);
(Continued)

(58) Field of Classification Search
CPC .... B62J 2099/0046; B62J 11/00; F16B 35/06; F16B 23/0061; F16B 23/0069; H01R 4/32; H01R 4/308
(Continued)

(56) References Cited

U.S. PATENT DOCUMENTS 2,292,102 A * 8/1942 Cluett .................... H01B 17/58
174/153 G
3,140,909 A * 7/1964 Danesi ..................... H01R 4/32
439/864
(Continued)

FOREIGN PATENT DOCUMENTS

DE 4005142 A1 * 8/1991 ............... H01R 4/32
DE 29614837 U1 * 10/1996 ............... H01R 4/32
(Continued)

OTHER PUBLICATIONS

Lusterklemme, Wikipedia Website, Available Online at https://de.wikipediaorg/w/index.php?title=Lüsterklemme&oldid=166768285, Website Available as Early as Jun. 27, 2017, 8 of pages.
(Continued)

*Primary Examiner* — Justin M Larson
(74) *Attorney, Agent, or Firm* — Alleman Hall Creasman & Tuttle LLP (57) ABSTRACT

To provide a fastener improving assembling efficiency and a wiring assembly including the fastener, a fastener includes a head including a first inner peripheral surface and a groove and a shank. The first inner peripheral surface defines a first through hole. The groove is in communication with the first through hole and extends in a direction intersecting with a direction in which the first through hole extends. The shank includes a second inner peripheral surface defining a second through hole that is in communication with the first through hole. The shank is connected to the head.

24 Claims, 6 Drawing Sheets

(51) Int. Cl.
*F16B 35/04* (2006.01)
*B62K 19/40* (2006.01)
*B62M 25/08* (2006.01)
*F16B 35/06* (2006.01)
*H01R 4/30* (2006.01)
*H01R 13/02* (2006.01)
*B62J 11/13* (2020.01)

(52) U.S. Cl.
CPC ............ *F16B 35/06* (2013.01); *H01R 4/308* (2013.01); *B62J 11/13* (2020.02); *H01R 4/32* (2013.01); *H01R 13/02* (2013.01)

(58) Field of Classification Search
USPC ........................................................ 174/665
See application file for complete search history.

(56) References Cited

U.S. PATENT DOCUMENTS

| | | | | |
|---|---|---|---|---|
| 3,144,293 A | * | 8/1964 | De Smidt | H01R 4/32 439/797 |
| 3,283,290 A | * | 11/1966 | Carlson | H01R 4/32 439/812 |
| 3,321,735 A | * | 5/1967 | Duenke | H01B 17/26 439/727 |
| 4,511,018 A | | 4/1985 | Scott | |
| 4,804,197 A | * | 2/1989 | Drbal | H01R 4/308 174/665 |
| 4,940,249 A | * | 7/1990 | Drbal | H01R 4/308 174/665 |
| 4,944,699 A | * | 7/1990 | Velke, Sr. | H01R 4/308 174/84 S |
| 5,228,875 A | * | 7/1993 | Swenson, Sr. | H01R 4/308 174/84 S |
| 6,212,969 B1 | | 4/2001 | Kuo | |
| 7,396,032 B2 | * | 7/2008 | Horiuchi | B62K 19/32 280/279 |
| 9,285,561 B2 | * | 3/2016 | Takakura | G02B 6/3624 |
| 9,563,022 B2 | * | 2/2017 | Takakura | G02B 6/3624 |
| 9,994,208 B2 | * | 6/2018 | Nakakura | B60T 17/043 |
| 10,207,771 B2 | * | 2/2019 | Rosen | B62M 25/08 |
| 2006/0243542 A1 | | 11/2006 | Tsai | |
| 2015/0086293 A1 | * | 3/2015 | Takakura | G02B 6/3624 411/337 |
| 2017/0089965 A1 | * | 3/2017 | Klapper | H01R 4/308 |
| 2019/0061856 A1 | * | 2/2019 | Mishima | B62J 11/00 |

FOREIGN PATENT DOCUMENTS

| | | | | |
|---|---|---|---|---|
| DE | 102018120062 A1 | * | 2/2019 | ............ B62J 11/00 |
| JP | 2003322756 A | * | 11/2003 | ............ G02B 6/32 |
| JP | 2005053363 A | | 3/2005 | |
| WO | WO-2009097731 A1 | * | 8/2009 | ............ B62K 19/30 |

OTHER PUBLICATIONS

Hohlschraube 133.0371.883 für Franke Keramik u. Fragranit Spülen/Ersatzteil, Sold by Franke Kitchen Systems, Representative Website Available at https://www.amazon.de/dp/B073FQ7NH1/ref=cm_sw_em_r_mt_dp_U_73XhFbGT2B2WM, Website Available as Early as Jun. 28, 2017, 16 of pages.
Einstellschraube für Bowdenzug Simson S51, S50, SR50, Schwalbe KR51, SR4, Sold by MZA, Representative Website Available at https://www.amazon.de/dp/B0050GJ4TM/ref=cm_sw_em_r_mt_dp_U_N9XhFb74KQ4HE, Website Available as Early as Apr. 2, 2015, 15 of pages.

* cited by examiner

FASTENER AND WIRING ASSEMBLY INCLUDING FASTENER

BACKGROUND ART

The present invention relates to a fastener including a through hole and a wiring assembly including the fastener.

A bicycle in which a linear member such as a wire is arranged inside a bicycle frame is known. The bicycle includes a wiring assembly including the linear member connected to various kinds of bicycle components and a through hole provided in the bicycle frame to allow for the internal arrangement of the linear member. Patent document 1 discloses one example of a prior art bicycle.

Patent Document 1: Japanese Laid-Open Patent Publication No. 2005-53363

SUMMARY OF THE INVENTION

It is desirable that a wiring assembly facilitates the wiring of a linear member. In the prior art, the problem to be solved is considered based on a wiring assembly related to the wiring of a bicycle as an example. However, the same problem occurs in a wiring assembly related to the wiring of a component other than a bicycle.

It is an object of the present invention to provide a fastener improving assembling efficiency and a wiring assembly including the fastener.

In accordance with a first aspect of the present invention, a fastener includes a head including a first inner peripheral surface and a groove and a shank. The first inner peripheral surface defines a first through hole. The groove is in communication with the first through hole and extends in a direction intersecting with a direction in which the first through hole extends. The shank includes a second inner peripheral surface defining a second through hole that is in communication with the first through hole. The shank is connected to the head.

The first through hole and the second through hole are used to arrange the linear member. This improves assembling efficiency. Additionally, the linear member is internally arranged with the fastener. This dispenses with a through hole for insertion of the linear member.

In accordance with a second aspect of the present invention, the fastener according to the first aspect is configured so that the head further includes a first outer peripheral surface opposite to the first inner peripheral surface in the direction intersecting with the direction in which the first through hole extends. The groove is in communication with a first opening provided in the first outer peripheral surface.

The linear member can be arranged from the side of the head of the fastener. This improves assembling efficiency.

In accordance with a third aspect of the present invention, the fastener according to the second aspect is configured so that the first opening is defined by an edge including a first curved surface.

Thus, the linear member does not easily wear.

In accordance with a fourth aspect of the present invention, the fastener according to any one of the first to third aspects is configured so that the head further includes a first end connected to the shank and a second end opposite to the first end in the direction in which the first through hole extends. The groove is in communication with a second opening provided in the second end.

The linear member can be arranged from the upper side of the head of the fastener. This improves assembling efficiency.

In accordance with a fifth aspect of the present invention, the fastener according to the fourth aspect is configured so that the second opening is defined by an edge including a second curved surface.

Thus, the linear member does not easily wear.

In accordance with a sixth aspect of the present invention, the fastener according to any one of the first to fifth aspects is configured so that the shank further includes a third end connected to the head and a fourth end opposite to the third end in a direction in which the second through hole extends. The second through hole is in communication with a third opening provided in the fourth end.

The linear member can be arranged from the lower side of the shank of the fastener. This improves assembling efficiency.

In accordance with a seventh aspect of the present invention, the fastener according to the sixth aspect is configured so that the third opening is defined by an edge including a third curved surface.

Thus, the linear member does not easily wear.

In accordance with an eighth aspect of the present invention, the fastener according to any one of the first to seventh aspects is configured so that the head further includes an additional groove different from the groove.

In a case where the fastener is rotated about the center axis of the shank and fixed to a subject, the rotation phase of the fastener is easily adjusted to appropriately arrange the linear member in a groove. This improves assembling efficiency.

In accordance with a ninth aspect of the present invention, the fastener according to any one of the first to eighth aspects is configured so that the shank further includes a second outer peripheral surface opposite to the second inner peripheral surface in a direction intersecting with a direction in which the second through hole extends. The second outer peripheral surface includes a threaded portion.

The fastener can be rotated about the center axis of the shank and fixed to a subject. This improves the usability.

In accordance with a tenth aspect of the present invention, a fastener includes a head including a first inner peripheral surface defining a first through hole, a shank including a second inner peripheral surface and a second outer peripheral surface, and a first electric terminal fixed to one of the first inner peripheral surface and the second inner peripheral surface. The second inner peripheral surface defines a second through hole that is in communication with the first through hole. The second outer peripheral surface is opposite to the second inner peripheral surface in a direction intersecting with a direction in which the second through hole extends. The shank is connected to the head. The second outer peripheral surface includes an engagement portion engaging with a subject different from the head.

The first through hole and the second through hole are used to arrange the linear member. This improves assembling efficiency. Additionally, the linear member is internally arranged with the fastener. This dispenses with a through hole for insertion of the linear member. Further, in a case where a wire is used as the linear member, the wire can be used in connection with the first electric terminal. This improves assembling efficiency.

In accordance with an eleventh aspect of the present invention, the fastener according to the tenth aspect is configured so that the first electric terminal is fixed to the first inner peripheral surface.

The wire can be connected to the first electric terminal from the head side of the fastener. This improves assembling efficiency.

In accordance with a twelfth aspect of the present invention, the fastener according to the eleventh aspect is configured so that the head further includes a first end connected to the shank and a second end opposite to the first end in a direction in which the first through hole extends. The first electric terminal is arranged on the second end.

The wire can be connected to the first electric terminal from the upper side of the head of the fastener. This improves assembling efficiency.

In accordance with a thirteenth aspect of the present invention, the fastener according to the tenth aspect is configured so that the first electric terminal is fixed to the second inner peripheral surface.

The wire can be connected to the first electric terminal from the shank side of the fastener. This improves assembling efficiency.

In accordance with a fourteenth aspect of the present invention, the fastener according to the thirteenth aspect is configured so that the shank further includes a third end connected to the head and a fourth end opposite to the third end in the direction in which the second through hole extends. The first electric terminal is arranged on the fourth end.

The wire can be connected to the first electric terminal from the lower side of the shank of the fastener. This improves assembling efficiency.

In accordance with a fifteenth aspect of the present invention, the fastener according to any one of the tenth to fourteenth aspects further includes a second electric terminal fixed to the other one of the first inner peripheral surface and the second inner peripheral surface.

The wire can be connected to the corresponding electric terminal from the head side and shank side of the fastener. This improves assembling efficiency.

In accordance with a sixteenth aspect of the present invention, the fastener according to any one of the first to fifteenth aspects is configured so that the head further includes a tool engagement portion.

The fastener can be fixed using a tool. This improves the usability.

In accordance with a seventeenth aspect of the present invention, the fastener according to any one of the first to sixteenth aspects is configured so that the head has a first maximum width in a direction intersecting with a direction in which the first through hole extends. The shank has a second maximum width in a direction intersecting with a direction in which the second through hole extends. The second maximum width is smaller than the first maximum width.

This improves the usability.

In accordance with an eighteenth aspect of the present invention, a wiring assembly includes the fastener according to any one of the first to seventeenth aspects and a linear member partially arranged in at least one of the first through hole and the second through hole.

The first through hole and the second through hole are used to arrange the linear member. This improves assembling efficiency. Additionally, the linear member is internally arranged with the fastener. This dispenses with a through hole for insertion of the linear member.

In accordance with a nineteenth aspect of the present invention, the wiring assembly according to the eighteenth aspect is configured so that the linear member includes a wire.

The first through hole and the second through hole can be reduced in diameter. This increases the strength of the fastener.

In accordance with a twentieth aspect of the present invention, the wiring assembly according to the eighteenth or nineteenth aspect is configured so that the fastener engages with a bicycle frame.

This improves assembling efficiency.

In accordance with a twenty-first aspect of the present invention, the wiring assembly according to the twentieth aspect further includes an intermediate member located between the head and the bicycle frame with the fastener engaged with the bicycle frame.

This limits damage to the bicycle frame caused by the engagement of the fastener with the bicycle frame. Additionally, the rotation phase of the fastener is easily adjusted. This improves assembling efficiency.

In accordance with a twenty-second aspect of the present invention, the wiring assembly according to the twentieth or twenty-first aspect is configured so that the linear member is electrically connected to a wireless communication portion located outside the bicycle frame.

The wireless communication portion is located outside the bicycle frame. This improves the radio wave reception performance of the wireless communication portion.

In accordance with a twenty-third aspect of the present invention, the wiring assembly according to the twenty-second aspect is configured so that the fastener fixes the wireless communication portion to the bicycle frame.

The fastener is inserted into a through hole that is needed to fix the wireless communication portion. Thus, in a case where the fastener is used to perform wiring with the linear member, a through hole for insertion of the linear member is dispensed with. This increases the strength of the bicycle frame.

In accordance with a twenty-fourth aspect of the present invention, the wiring assembly according to any one of the twentieth to twenty-second aspects is configured so that the fastener fixes a bottle cage to the bicycle frame.

The fastener is inserted into a through hole that fixes the bottle cage. Thus, in a case where the fastener is used to perform wiring with the linear member, a through hole for insertion of the linear member is dispensed with. This increases the strength of the bicycle frame.

In accordance with a twenty-fifth aspect of the present invention, the wiring assembly according to any one of the twentieth to twenty-fourth aspects is configured so that the fastener is fixed to at least one of a down tube and a seat tube of the bicycle frame.

In a case where at least one of the down tube and the seat tube is provided with a through hole that fixes the bottle cage, the fastener is inserted into the through hole. Thus, in a case where the fastener is used to perform wiring with the linear member, a through hole for insertion of the linear member is dispensed with. This increases the strength of the bicycle frame.

The fastener and the wiring assembly including the fastener according to the present invention improve assembling efficiency.

EMBODIMENTS OF THE INVENTION

First Embodiment

Figure 1:
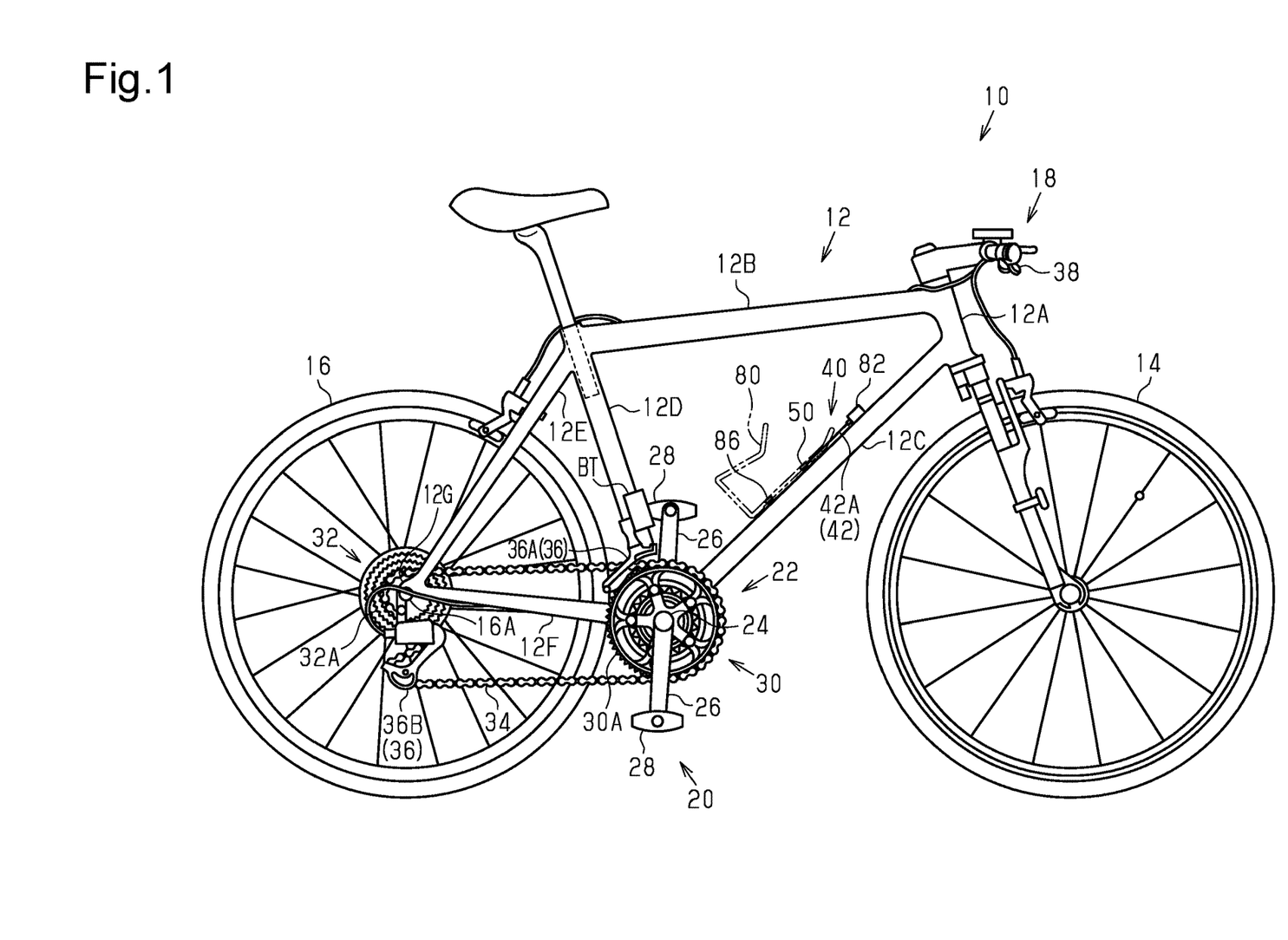
FIG. 1 is a side view of a bicycle including a first embodiment of a fastener.

A bicycle 10 including a fastener 50 will now be described with reference to FIG. 1. The type of the bicycle 10 shown in the drawings is, for example, a trekking bike. In one example, the bicycle 10 further includes a bicycle frame 12, a front wheel 14, a rear wheel 16, a handlebar 18, and a drivetrain 20. The bicycle frame 12 includes a head tube 12A, a top tube 12B, a down tube 12C, a seat tube 12D, a seatstay 12E, a chainstay 12F, and a rear end 12G. The fastener 50 engages with the bicycle frame 12. The fastener 50 is fixed to at least one of the down tube 12C and the seat tube 12D of the bicycle frame 12. In the example shown in FIG. 1, the fastener 50 is fixed to the down tube 12C.

The drivetrain 20 includes a crank assembly 22, a front sprocket assembly 30, a rear sprocket assembly 32, and a chain 34. The crank assembly 22 includes a crankshaft 24, a pair of crank arms 26, and a pair of pedals 28. The pair of pedals 28 is rotatably coupled to the end of the respective crank arms 26.

The front sprocket assembly 30 includes one or multiple front sprockets 30A and is coupled to, for example, the crank assembly 22 so as to rotate integrally with the crankshaft 24. The rear sprocket assembly 32 includes one or multiple rear sprockets 32A and is coupled to a hub 16A of the rear wheel 16. The chain 34 runs around any one of the front sprockets 30A of the front sprocket assembly 30 and any one of the rear sprockets 32A of the rear sprocket assembly 32. The transmission ratio of the bicycle 10 is changed by changing the combination of the front sprocket 30A and the rear sprocket 32A around which the chain 34 runs. Driving force applied to the pedals 28 by the rider of the bicycle 10 is transmitted via the front sprocket assembly 30, the chain 34, and the rear sprocket assembly 32 to the rear wheel 16.

The bicycle 10 further includes a battery BT, bicycle components 36, and an operation device 38. The battery BT includes one or multiple battery cells (not shown). The battery BT is, for example, a rechargeable battery. The battery BT is electrically connected to the bicycle components 36, for example, by wires (not shown). The operation device 38 is arranged on the handlebar 18. The operation device 38 is electrically connected to the bicycle components 36.

The bicycle components 36 include a first shifting device 36A and a second shifting device 36B. The first shifting device 36A is a front derailleur, for example, coupled to the seat tube 12D of the bicycle frame 12. In a case where the operation device 38 is operated to drive the first shifting device 36A, the front sprocket 30A around which the chain 34 runs is changed to change the transmission ratio of the bicycle 10. The second shifting device 36B is a rear derailleur coupled to the rear end 12G of the bicycle frame 12. In a case where the operation device 38 is operated to drive the second shifting device 36B, the rear sprocket 32A around which the chain 34 runs is changed to change the transmission ratio of the bicycle 10.

The bicycle 10 further includes a wiring assembly 40, a bottle cage 80, and a wireless communication portion 82. The wiring assembly 40 includes the fastener 50 and a linear member 42. The fastener 50 is configured to allow for insertion of the linear member 42. The fastener 50 fixes the bottle cage 80 to the bicycle frame 12. The fastener 50 includes a head 52 and a shank 70 connected to the head 52 (refer to FIG. 3). The linear member 42 includes a wire 42A. The linear member 42 is electrically connected to the wireless communication portion 82, which is located outside the bicycle frame 12. The linear member 42 is electrically connected to a junction unit 84 (refer to FIG. 2), which is located in an inner space S (refer to FIG. 2) of the bicycle frame 12. In one example, the linear member 42 extends through the fastener 50 to electrically connect the wireless communication portion 82 and the junction unit 84 (refer to FIG. 2). The junction unit 84 is arranged, for example, in the inner space S of the down tube 12C and electrically connected to the first shifting device 36A and the second shifting device 36B by wires (not shown).

The bottle cage 80 is configured to attach a bottle (not shown). The wireless communication portion 82 is configured to transmit or receive a wireless signal. The wireless communication portion 82 is located, for example, on the down tube 12C of the bicycle frame 12. In one example, the wireless communication portion 82 receives a wireless signal from the operation device 38 and transmits the received signal to at least one of the first shifting device 36A and the second shifting device 36B.

Figure 2:
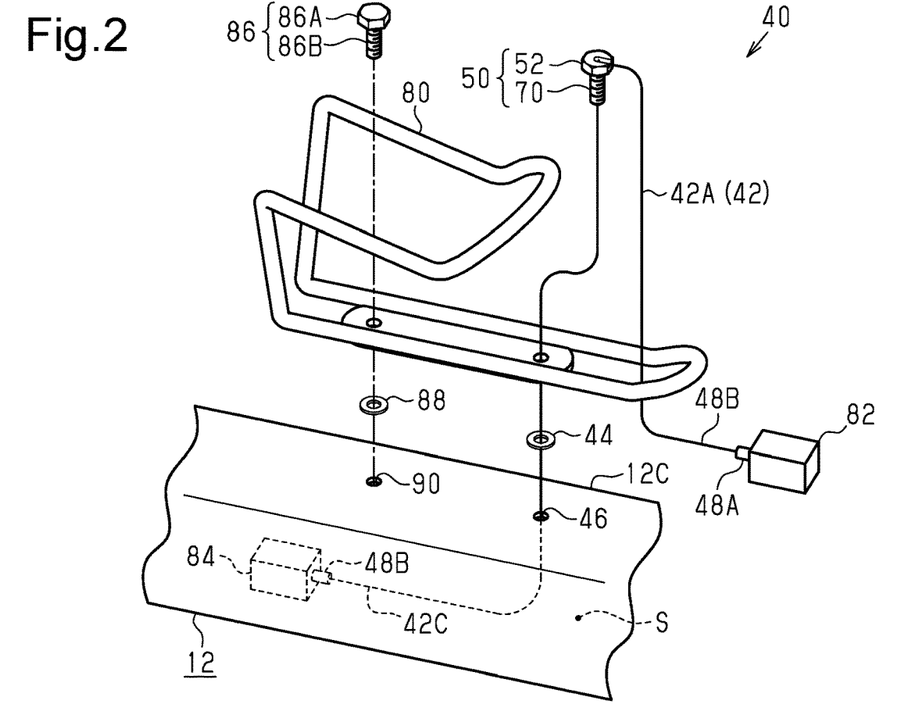
FIG. 2 is an exploded perspective view showing the connection relationship between the fastener of FIG. 1 and its surrounding configuration.

As shown in FIG. 2, the wiring assembly 40 further includes an intermediate member 44. With the fastener 50 engaged with the bicycle frame 12, the intermediate member 44 is located between the head 52 of the fastener 50 and the bicycle frame 12. In one example, with the fastener 50 engaged with the bicycle frame 12, the intermediate member 44 is located between the bottle cage 80 and the down tube 12C. One example of the intermediate member 44 is a washer. The fastener 50 extends through the bottle cage 80 and the intermediate member 44 and engages with a through hole 46 provided in the bicycle frame 12. The through hole 46 engages with the shank 70 of the fastener 50. In one example, the through hole 46 is provided in the down tube 12C to allow for communication between the outer portion of the bicycle frame 12 and the inner space S of the bicycle frame 12.

The wiring assembly 40 further includes a first electric terminal 48A and a second electric terminal 48B. The first electric terminal 48A is arranged, for example, on one end 42B of the wire 42A. The wire 42A is electrically connected to the wireless communication portion 82 via the first electric terminal 48A. The second electric terminal 48B is arranged, for example, on the other end 42C of the wire 42A. The wire 42A is electrically connected to the junction unit 84 via the second electric terminal 48B.

The bicycle 10 further includes a fastening member 86 and an intermediate member 88. The fastening member 86 engages with the bicycle frame 12 to fix the bottle cage 80 to the bicycle frame 12. The fastening member 86 includes a head 86A and a shank 86B connected to the head 86A. One example of the fastening member 86 is a hexagon bolt. The fastening member 86 can be, for example, a rivet, a press-fitting pin, or a set screw. With the fastening member 86 engaged with the bicycle frame 12, the intermediate member 88 is located between the head 86A of the fastening member 86 and the bicycle frame 12. In one example, with the fastening member 86 engaged with the bicycle frame 12, the intermediate member 88 is located between the bottle cage 80 and the down tube 12C. One example of the intermediate member 88 is a washer. The fastening member 86 extends through the bottle cage 80 and the intermediate member 88 and engages with a through hole 90 provided in the bicycle frame 12. The through hole 90 engages with the shank 86B of the fastening member 86. In one example, the through hole 90 is provided in the down tube 12C to allow for communication between the outer portion of the bicycle frame 12 and the inner space S of the bicycle frame 12. In the illustrated example, the bottle cage 80 is fixed to the down tube 12C by the fastener 50 and the fastening member 86. The fastening member 86, the intermediate member 88, and the through hole 90 can be omitted from the bicycle 10.

The configuration of the fastener 50 will now be described with reference to FIGS. 3 to 5.

Figure 3:
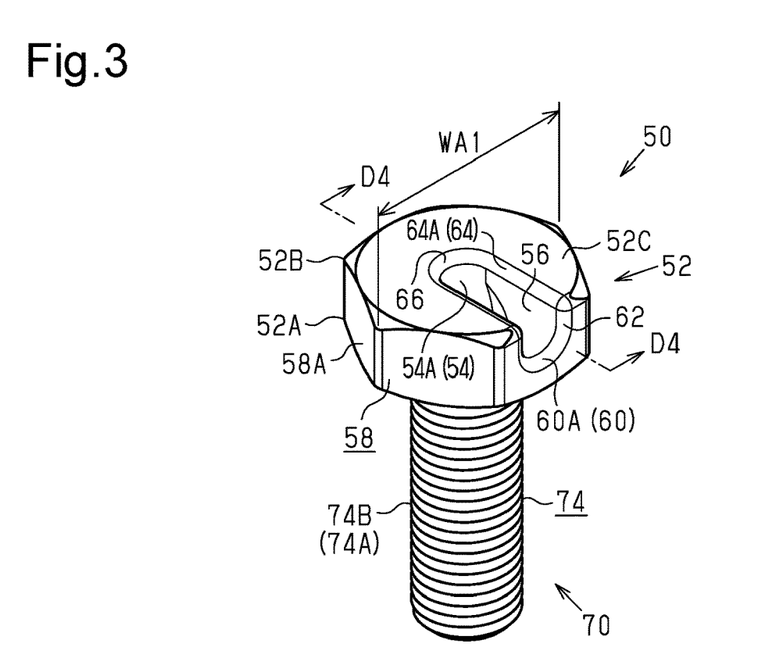
FIG. 3 is a perspective view showing the fastener of FIG. 2.

As shown in FIG. 3, the head 52 of the fastener 50 includes a first inner peripheral surface 54 and a groove 56. The first inner peripheral surface 54 defines a first through hole 54A. The groove 56 is in communication with the first through hole 54A and extends in a direction intersecting with a direction in which the first through hole 54A extends. The direction in which the first through hole 54A extends conforms to the direction extending along a center axis C1 (refer to FIG. 4) of the first through hole 54A. The first through hole 54A is a hole into which the linear member 42 is insertable. The groove 56 is a groove in which the linear member 42 is arrangeable.

The head 52 further includes a first outer peripheral surface 58 opposite to the first inner peripheral surface 54 in the direction intersecting with the direction in which the first through hole 54A extends. The groove 56 is in communication with a first opening 60 provided in the first outer peripheral surface 58. The first opening 60 is defined by an edge 60A including a first curved surface 62. In one example, the first curved surface 62 is provided on the entire edge 60A of the first opening 60. One example of the shape of the first outer peripheral surface 58 is a hexagon in a plan view of the fastener 50.

The head 52 further includes a first end 52A connected to the shank 70 and a second end 52B opposite to the first end 52A in the direction in which the first through hole 54A extends. The groove 56 is in communication with a second opening 64 provided in the second end 52B. In one example, the first through hole 54A and the groove 56 are in communication with the second opening 64. The second opening 64 opens in an end surface 52C of the head 52 located at the side of the second end 52B and extends from the center of the head 52 toward the first outer peripheral surface 58 in the direction intersecting with the direction in which the first through hole 54A extends. The second opening 64 is connected to the first opening 60. The second opening 64 is defined by an edge 64A including a second curved surface 66. In one example, the second curved surface 66 is provided on the entire edge 64A of the second opening 64.

The head 52 further includes a tool engagement portion 58A. The tool engagement portion 58A is engageable with a tool. The tool engagement portion 58A is provided on the first outer peripheral surface 58 of the head 52. One example of the shape of the tool engagement portion 58A is a hexagon in a plan view of the fastener 50. The tool engagement portion 58A can be provided on the end surface 52C of the head 52, which is located at the side of the second end 52B. In this example, the tool engagement portion 58A is a hole engageable with a hex key (not shown).

Figure 4:
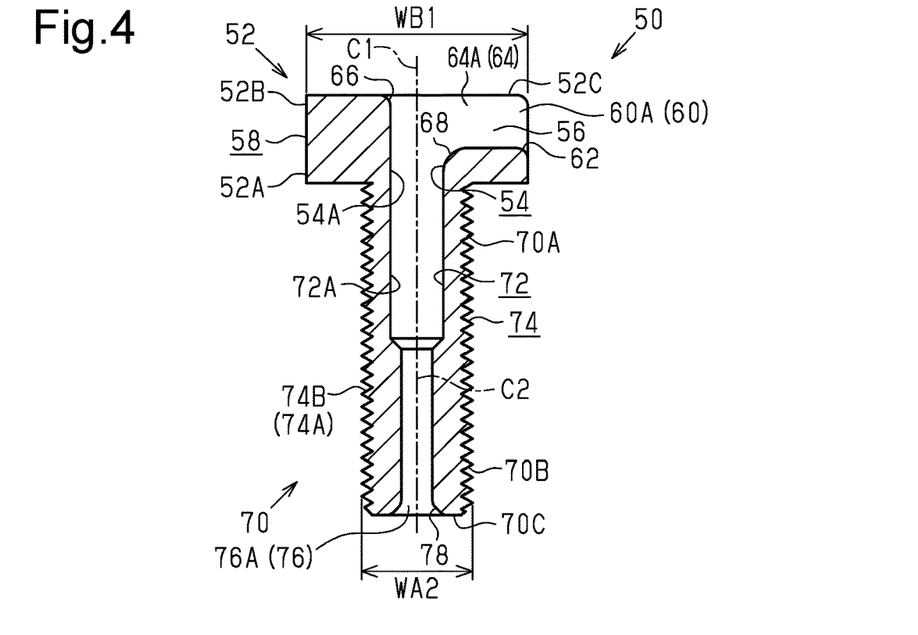
FIG. 4 is a cross-sectional view taken along line D4-D4 in FIG. 3.

As shown in FIG. 4, the shank 70 of the fastener 50 includes a second inner peripheral surface 72 defining a second through hole 72A that is in communication with the first through hole 54A. The second through hole 72A is a hole into which the linear member 42 is insertable. The shank 70 further includes a second outer peripheral surface 74 opposite to the second inner peripheral surface 72 in a direction intersecting with a direction in which the second through hole 72A extends. The direction in which the second through hole 72A extends conforms to the direction extending along a center axis C2 of the second through hole 72A. The center axis C2 of the second through hole 72A coincides with the center axis C1 of the first through hole 54A. The second outer peripheral surface 74 includes an engagement portion 74A engaging with a subject different from the head 52. One example of the subject is the through hole 46 of the down tube 12C. The second outer peripheral surface 74 includes a threaded portion 74B as the engagement portion 74A. The basic structure of the fastener 50 is the same as that of a hexagon bolt. The through hole 46 is defined by a wall surface including a threaded portion (not shown) engageable with the threaded portion 74B.

The shank 70 further includes a third end 70A connected to the head 52 and a fourth end 70B opposite to the third end 70A in the direction in which the second through hole 72A extends. The second through hole 72A is in communication with a third opening 76 provided in the fourth end 70B. The third opening 76 opens in a bottom surface 70C of the shank 70 located at the side of the fourth end 70B. The third opening 76 is defined by an edge 76A including a third curved surface 78. In one example, the third curved surface 78 is provided on the entire edge 76A of the third opening 76. The second through hole 72A has a smaller diameter in the fourth end 70B than in the third end 70A. The second through hole 72A can have the same diameter in the fourth end 70B and the third end 70A. The head 52 includes a fourth curved surface 68 on a portion where the first inner peripheral surface 54 is connected to the groove 56.

The head 52 has a first maximum width WA1 and a first minimum width WB1 (refer to FIG. 3) in the direction intersecting with the direction in which the first through hole 54A extends. The first maximum width WA1 is the maximum width of the head 52 in the direction intersecting with the direction in which the first through hole 54A extends. The first minimum width WB1 is the minimum width of the head 52 in the direction intersecting with the direction in which the first through hole 54A extends. The shank 70 has a second maximum width WA2, which is smaller than the first maximum width WA1 in the direction intersecting with the direction in which the second through hole 72A extends. The second maximum width WA2 is the maximum width of the shank 70 in the direction intersecting with the direction in which the second through hole 72A extends. The second maximum width WA2 is smaller than the first minimum width WB1.

Figure 5:
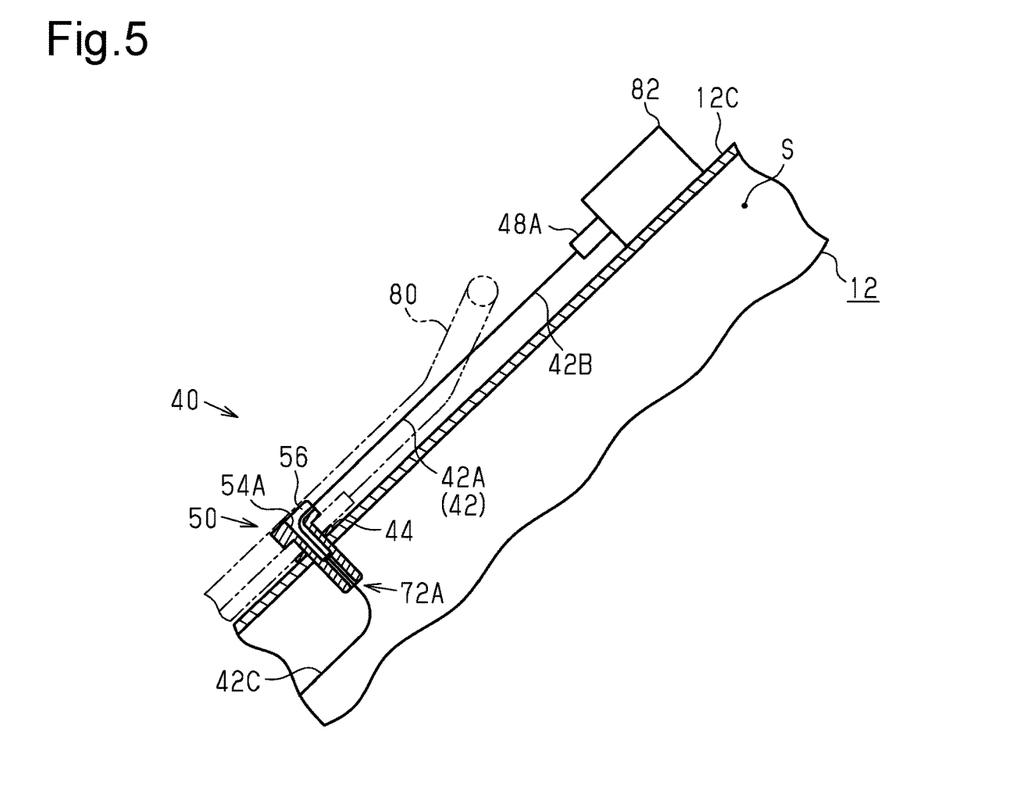
FIG. 5 is a cross-sectional view showing the wiring assembly of FIG. 2 and its surroundings.

As shown in FIG. 5, the linear member 42 is partially arranged in at least one of the first through hole 54A and the second through hole 72A. In one example, the linear member 42 is partially arranged in the groove 56, the first through hole 54A, and the second through hole 72A so that the one end 42B is drawn out of the first opening 60 and the other end 42C is drawn out of the third opening 76. The linear member 42 is arranged to extend through the fastener 50 as described above. The first electric terminal 48A is connected to the wireless communication portion 82. The second electric terminal 48B is connected to the junction unit 84. The fastener 50 is fixed to the bicycle frame 12 to fix the bottle cage 80. As described above, the fastener 50 is used to arrange the linear member 42 in the bicycle frame 12 and fix the bottle cage 80 to the bicycle frame 12.

Second Embodiment

A second embodiment of a fastener 150 will now be described with reference to FIGS. 6 and 7. The same reference characters are given to those elements that are the same as the corresponding elements of the first embodiment. Such elements will not be described in detail.

Figure 6:
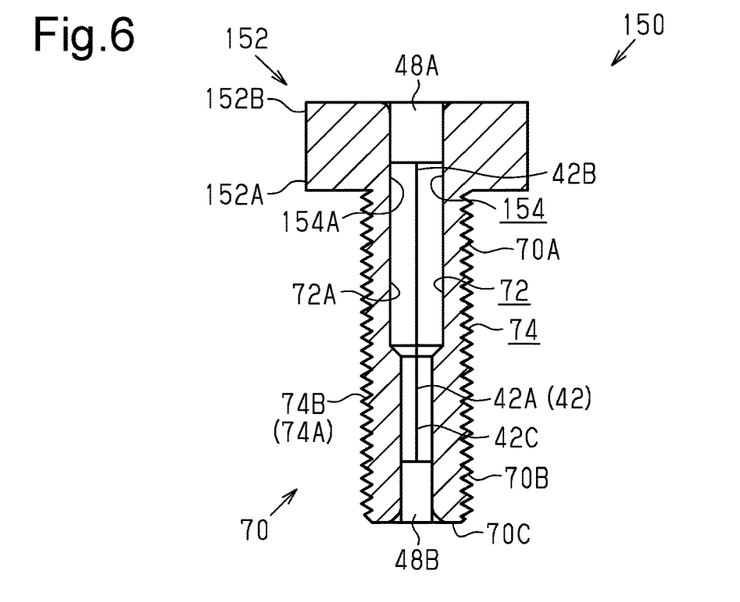
FIG. 6 is a cross-sectional view showing a second embodiment of a fastener.

As shown in FIG. 6, the fastener 150 of the second embodiment includes a head 152, the shank 70, the first electric terminal 48A, and the second electric terminal 48B. The head 152 includes a first inner peripheral surface 154 defining a first through hole 154A. The head 152 further includes a first end 152A connected to the shank 70 and a second end 152B opposite to the first end 152A in a direction in which the first through hole 154A extends. The direction in which the first through hole 154A extends conforms to the direction extending along a center axis (not shown) of the first through hole 154A.

The first electric terminal 48A is fixed to one of the first inner peripheral surface 154 and the second inner peripheral surface 72. In one example, the first electric terminal 48A is fixed to the first inner peripheral surface 154. More specifically, the first electric terminal 48A is fixed to the first inner peripheral surface 154 so as to be arranged on the second end 152B of the head 152. The first electric terminal 48A can be fixed to the first inner peripheral surface 154 so as to be arranged on the first end 152A of the head 152 or a portion of the head 152 between the first end 152A and the second end 152B. The second electric terminal 48B is fixed to the other one of the first inner peripheral surface 154 and the second inner peripheral surface 72. In one example, the second electric terminal 48B is fixed to the second inner peripheral surface 72. More specifically, the second electric terminal 48B is fixed to the second inner peripheral surface 72 so as to be arranged on the fourth end 70B of the shank 70. The second electric terminal 48B can be fixed to the second inner peripheral surface 72 so as to be arranged on the third end 70A of the shank 70 or a portion of the shank 70 between the third end 70A and the fourth end 70B. In the example shown in FIG. 6, the fastener 150 has a configuration in which the groove 56 (refer to FIG. 4) is omitted. In one example, the head 152 has substantially the same structure as that of the head 52 (refer to FIG. 4) of the fastener 50 except for the groove 56.

The linear member 42 includes the wire 42A. The one end 42B of the wire 42A is electrically connected to the first electric terminal 48A. The other end 42C of the wire 42A is electrically connected to the second electric terminal 48B. In one example, the wire 42A is partially arranged in the first through hole 154A and the second through hole 72A to electrically connect the first electric terminal 48A and the second electric terminal 48B.

Figure 7:
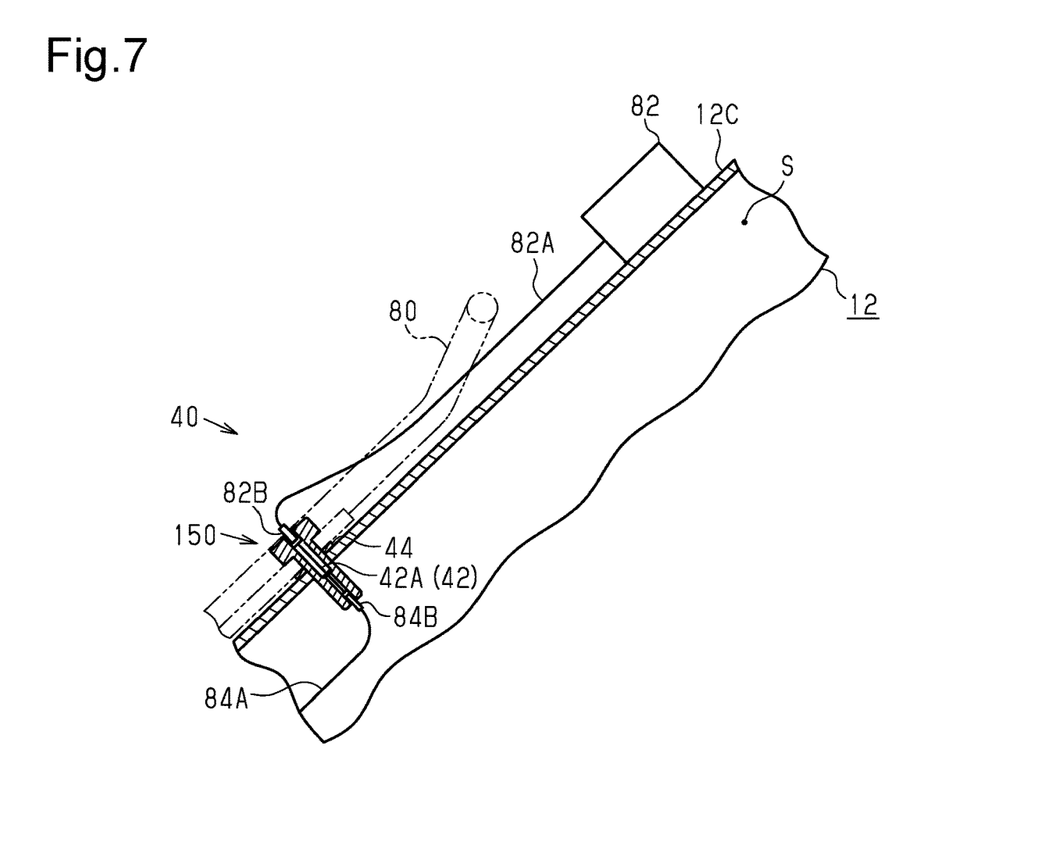
FIG. 7 is a cross-sectional view showing a wiring assembly of the second embodiment and its surroundings.

As shown in FIG. 7, a first wire 82A extends from the wireless communication portion 82 and is connected to the first electric terminal 48A via a first connector 82B, and a second wire 84A extends from the junction unit 84 (refer to FIG. 2) and is connected to the second electric terminal 48B via a second connector 84B. The first connector 82B is arranged on an end of the first wire 82A. The first electric terminal 48A is configured to be connectable with the first connector 82B. The second connector 84B is arranged on an end of the second wire 84A. The second electric terminal 48B is configured to be connectable with the second connector 84B. The first connector 82B is connected to the first electric terminal 48A, and the second connector 84B is connected to the second electric terminal 48B. This electrically connects the wireless communication portion 82 and the junction unit 84.

At least one of the first wire 82A, the first connector 82B, the second wire 84A, and the second connector 84B can form part of the wiring assembly 40. In one example of a configuration, the first wire 82A is electrically connected to the wireless communication portion 82 via a third electric terminal (not shown), and the second wire 84A is electrically connected to the junction unit 84 via a fourth electric terminal (not shown). The third electric terminal is arranged on an end of the first wire 82A opposite to the first connector 82B. The fourth electric terminal is arranged on an end of the second wire 84A opposite to the second connector 84B. In this example, the wiring assembly 40 further includes the first wire 82A, the first connector 82B, the second wire 84A, the second connector 84B, the third electric terminal, and the fourth electric terminal.

Third Embodiment

Figure 8:
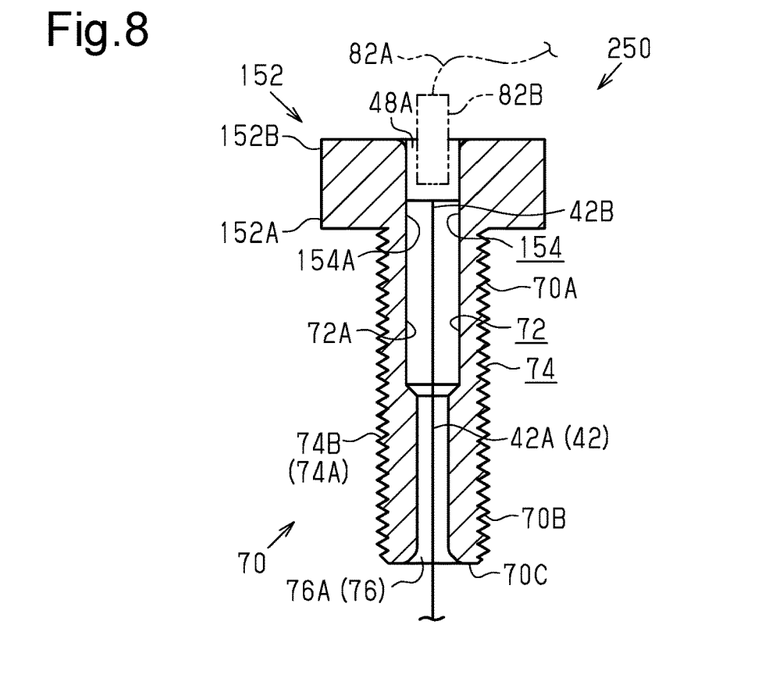
FIG. 8 is a cross-sectional view showing a third embodiment of a fastener.

A third embodiment of a fastener 250 will now be described with reference to FIG. 8. The same reference characters are given to those elements that are the same as the corresponding elements of the first embodiment. Such elements will not be described in detail.

The fastener 250 of the third embodiment includes the head 152, the shank 70, and the first electric terminal 48A. The head 152 of the third embodiment has substantially the same structure as that of the head 152 of the second embodiment. The first electric terminal 48A is fixed to one of the first inner peripheral surface 154 and the second inner peripheral surface 72. In one example, the first electric terminal 48A is fixed to the first inner peripheral surface 154. More specifically, the first electric terminal 48A is fixed to the first inner peripheral surface 154 so as to be arranged on the second end 152B of the head 152. The first electric terminal 48A can be fixed to the first inner peripheral surface 154 so as to be arranged on the first end 152A of the head 152 or a portion of the head 152 between the first end 152A and the second end 152B. In the example shown in FIG. 8, the fastener 250 has a configuration in which the groove 56 (refer to FIG. 4) is omitted.

The linear member 42 includes the wire 42A. The one end 42B of the wire 42A is electrically connected to the first electric terminal 48A. In the same manner as the second embodiment, the first wire 82A extends from the wireless communication portion 82 (refer to FIG. 7) and is connected to the first electric terminal 48A via the first connector 82B. The first connector 82B is arranged on an end of the first wire 82A. The first electric terminal 48A is configured to be connectable with the first connector 82B. The second electric terminal 48B is arranged on the other end 42C of the wire 42A. The wire 42A is electrically connected to the junction unit 84 (refer to FIG. 2) via the second electric terminal 48B. The first connector 82B is connected to the first electric terminal 48A, and the second electric terminal 48B is connected to the junction unit 84. This electrically connects the wireless communication portion 82 and the junction unit 84. In the same manner as the second embodiment, the first wire 82A and the first connector 82B can form part of the wiring assembly 40.

Fourth Embodiment

Figure 9:
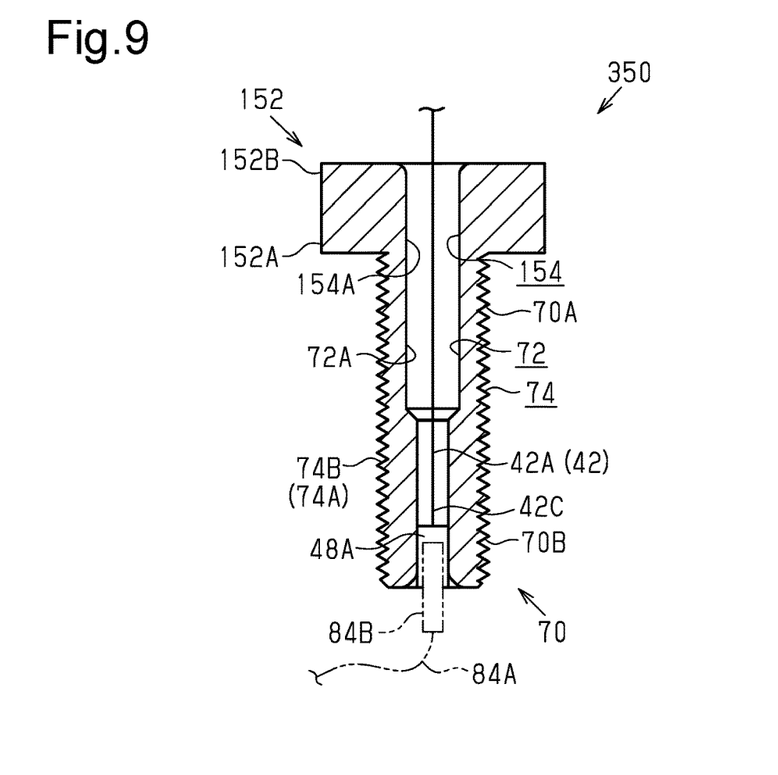
FIG. 9 is a cross-sectional view showing a fourth embodiment of a fastener.

A fourth embodiment of a fastener 350 will now be described with reference to FIG. 9. The same reference characters are given to those elements that are the same as the corresponding elements of the first embodiment. Such elements will not be described in detail.

The fastener 350 of the fourth embodiment includes the head 152, the shank 70, and the first electric terminal 48A. The head 152 of the fourth embodiment has substantially the same structure as that of the head 152 of the second embodiment. The first electric terminal 48A is fixed to one of the first inner peripheral surface 154 and the second inner peripheral surface 72. In one example, the first electric terminal 48A is fixed to the second inner peripheral surface 72. More specifically, the first electric terminal 48A is fixed to the second inner peripheral surface 72 so as to be arranged on the fourth end 70B of the shank 70. The first electric terminal 48A can be fixed to the second inner peripheral surface 72 so as to be arranged on the third end 70A of the shank 70 or a portion of the shank 70 between the third end 70A and the fourth end 70B. The first electric terminal 48A of the fourth embodiment functions as the second electric terminal 48B (refer to FIG. 6) of the second embodiment. In the example shown in FIG. 9, the fastener 350 has a configuration in which the groove 56 (refer to FIG. 4) is omitted.

The linear member 42 includes the wire 42A. The second electric terminal 48B is arranged on the one end 42B of the wire 42A. The second electric terminal 48B of the fourth embodiment functions as the first electric terminal 48A (refer to FIG. 5) of the first embodiment. The wire 42A is electrically connected to the wireless communication portion 82 (refer to FIG. 5) via the second electric terminal 48B. The other end 42C of the wire 42A is electrically connected to the first electric terminal 48A. In the same manner as the second embodiment, the second wire 84A extends from the junction unit 84 (refer to FIG. 2) and is connected to the first electric terminal 48A via the second connector 84B. The second connector 84B is arranged on an end of the second wire 84A. The first electric terminal 48A is configured to be connectable with the second connector 84B. The second electric terminal 48B is connected to the wireless communication portion 82, and the second connector 84B is connected to the first electric terminal 48A. This electrically connects the wireless communication portion 82 and the junction unit 84. In the same manner as the second embodiment, the second wire 84A and the second connector 84B can form part of the wiring assembly 40.

Fifth Embodiment

Figure 10:
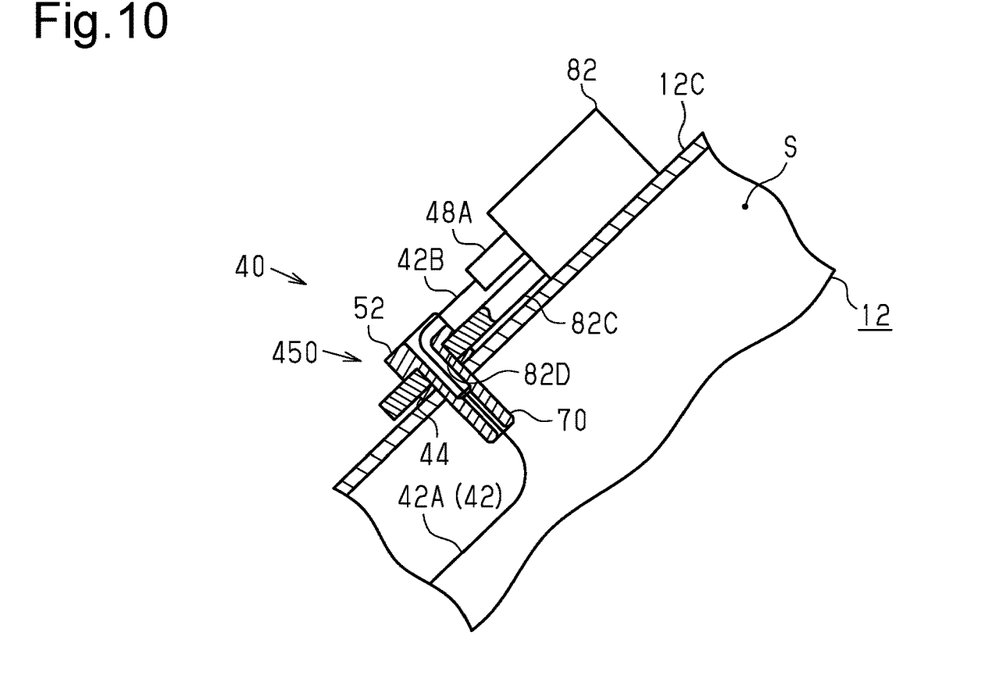
FIG. 10 is a cross-sectional view showing a fifth embodiment of a wiring assembly and its surroundings.

A fifth embodiment of a wiring assembly 40 will now be described with reference to FIG. 10. The same reference characters are given to those elements that are the same as the corresponding elements of the first embodiment. Such elements will not be described in detail.

A fastener 450 of the fifth embodiment includes the head 52 and the shank 70. The fastener 450 fixes the wireless communication portion 82 to the bicycle frame 12. The wireless communication portion 82 includes a fixing portion 82C including a through hole 82D into which the shank 70 of the fastener 450 is insertable. With the fastener 450 engaged with the bicycle frame 12, the fixing portion 82C of the wireless communication portion 82 is located between the head 52 of the fastener 450 and the bicycle frame 12. In one example, with the fastener 450 engaged with the bicycle frame 12, the intermediate member 44 is located between the fixing portion 82C of the wireless communication portion 82 and the bicycle frame 12. The fastener 450 extends through the fixing portion 82C of the wireless communication portion 82 and is fixed to the bicycle frame 12. Thus, the wireless communication portion 82 is fixed to the bicycle frame 12. As described above, the fastener 450 is used to arrange the linear member 42 in the bicycle frame 12 and fix the wireless communication portion 82 to the bicycle frame 12. The bottle cage 80, the fastening member 86, the intermediate member 88, and the through hole 90 can be omitted from the bicycle 10 of the fifth embodiment.

Modified Examples

The above description illustrates embodiments of a fastener and a wiring assembly including a fastener according to the present invention and is not intended to be restrictive. The fastener and the wiring assembly including the fastener according to the present invention include, for example, modified examples of the above embodiments that are described below. Further, two or more of the modified examples can be combined. In the modified examples described below, the same reference characters are given to those elements that are the same as the corresponding elements of the embodiments. Such elements will not be described in detail.

Figure 11:
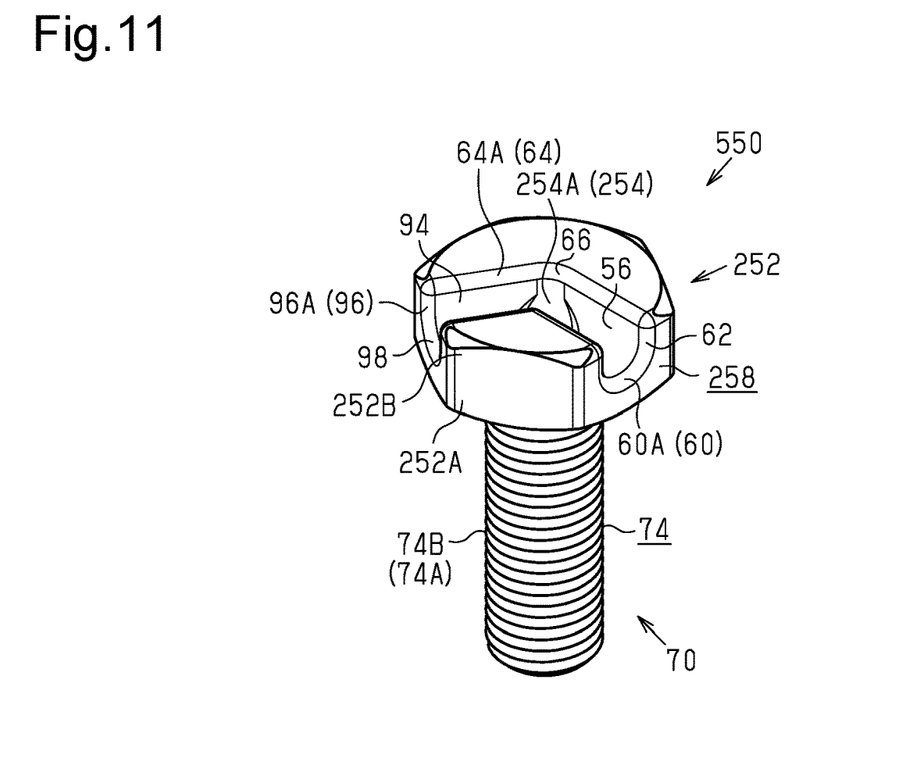
FIG. 11 is a perspective view showing a modified example of a fastener.

The groove 56 can be changed to any configuration. In a first example, the groove 56 is not in communication with the first opening 60. In a second example, the groove 56 is not in communication with the second opening 64. In a third example, as shown in FIG. 11, a fastener 550 includes a head 252 and the shank 70. The head 252 includes a first inner peripheral surface 254 defining a first through hole 254A and the groove 56 that is in communication with the first through hole 254A and extends in a direction intersecting with a direction in which the first through hole 254A extends. The direction in which the first through hole 254A extends conforms to the direction extending along a center axis (not shown) of the first through hole 254A. The head 252 further includes a first end 252A connected to the shank 70 and a second end 252B opposite to the first end 252A in the direction in which the first through hole 254A extends. The head 252 further includes a first outer peripheral surface 258 opposite to the first inner peripheral surface 254 in the direction intersecting with the direction in which the first through hole 254A extends. The head 252 further includes an additional groove 94 different from the groove 56. The additional groove 94 is a groove in which the linear member 42 is arrangeable. The additional groove 94 is in communication with the groove 56 via the first through hole 254A. The additional groove 94 is in communication with a fourth opening 96 that is provided in the first outer peripheral surface 258 and is different from the first opening 60. The fourth opening 96 is defined by an edge 96A including a fifth curved surface 98. In one example, the fifth curved surface 98 is provided on the entire edge 96A of the fourth opening 96. The additional groove 94 is in communication with the second opening 64 provided in the second end 252B of the head 252. The head 252 has substantially the same structure as that of the head 52 of the fastener 50 except for the additional groove 94. The additional groove 94 can be configured so as not to be in communication with at least one of the second opening 64 and the fourth opening 96. The head 252 can include two or more additional grooves 94 different from the groove 56.

The edge 60A of the first opening 60 can be changed to any configuration. In a first example, the first curved surface 62 is provided on part of the edge 60A of the first opening 60. In a second example, the edge 60A of the first opening 60 does not include the first curved surface 62. The edge 64A of the second opening 64, the edge 76A of the third opening 76, and the edge 96A of the fourth opening 96 can also be modified in the same manner.

The subject with which the fastener 50 (150, 250, 350, 450, 550) engages can be changed to any subject. In a first example, the fastener 50 (150, 250, 350, 450, 550) is fixed to at least one of the head tube 12A, the top tube 12B, the seat tube 12D, the seatstay 12E, the chainstay 12F, and the rear end 12G instead of or in addition to the down tube 12C. In a second example, the fastener 50 (150, 250, 350, 450, 550) is fixed to an element different from the bicycle 10.

The subject fixed by the fastener 50 (150, 250, 350, 450, 550) can be changed to any subject. In a first example, the fastener 50 (150, 250, 350, 450, 550) fixes an element that is mountable on the bicycle 10 and different from the bottle cage 80 to the bicycle frame 12. In a second example, the fastener 50 (150, 250, 350, 450, 550) is used just to perform wiring with the linear member 42. In the first and second examples, the bicycle 10 can have a configuration in which the bottle cage 80 is omitted.

The basic structure of the fastener 50 (150, 250, 350, 450, 550) can be changed to any structure. In a first example, the basic structure of the fastener 50 (150, 250, 350, 450, 550) is a rivet. In a second example, the basic structure of the fastener 50 (150, 250, 350, 450, 550) is a press-fitting pin. In a third example, the basic structure of the fastener 50 (150, 250, 350, 450, 550) is a set screw. In the first to third examples, the relationship between the first maximum width WA1 and the second maximum width WA2 is accordingly changed.

The configuration of the intermediate member 44 can be changed to any configuration. In a first example, with the fastener 50 (150, 250, 350, 450, 550) engaged with the bicycle frame 12, the intermediate member 44 is located between the head 52 (152, 252) and the bottle cage 80. In a second example, with the fastener 50 (150, 250, 350, 450, 550) engaged with the bicycle frame 12, the intermediate member 44 includes a first intermediate member located between the bottle cage 80 and the down tube 12C and a second intermediate member located between the head 52 (152, 252) and the bottle cage 80.

The configuration of the linear member 42 can be changed to any configuration. In one example, the linear member 42 includes a wire such as a Bowden cable.

The bicycle 10 can have a configuration in which the wireless communication portion 82 is omitted. In one example, the linear member 42 is arranged to extend through the fastener 50 (150, 250, 350, 450, 550) to electrically connect the operation device 38 and the junction unit 84 in a direct manner.

LIST OF REFERENCE CHARACTERS

12) bicycle frame, 12C) down tube, 12D) seat tube, 40) wiring assembly, 42) linear member, 42A) wire, 44) intermediate member, 48A) first electric terminal, 48B) second electric terminal, 50) fastener, 52) head, 52A) first end, 52B) second end, 54) first inner peripheral surface, 54A) first through hole, 56) groove, 58) first outer peripheral surface, 58A) tool engagement portion, 60) first opening, 60A) edge, 62) first curved surface, 64) second opening, 64A) edge, 66) second curved surface, 70) shank, 70A) third end, 70B) fourth end, 72) second inner peripheral surface, 72A) second through hole, 74) second outer peripheral surface, 74A) engagement portion, 74B) threaded portion, 76) third opening, 76A) edge, 78) third curved surface, 80) bottle cage, 82) wireless communication portion, 94) additional groove, 150) fastener, 152) head, 152A) first end, 152B) second end, 154) first inner peripheral surface, 154A) first through hole, 250) fastener, 252) head, 252A) first end, 252B) second end, 254) first inner peripheral surface, 254A) first through hole, 258) first outer peripheral surface, 350) fastener, 450) fastener, 550) fastener, WA1) first maximum width, WA2) second maximum width

The invention claimed is:

1. A fastener to be engaged with a bicycle, the fastener comprising:

a head including a first inner peripheral surface and a groove, wherein the first inner peripheral surface defines a first through hole, and the groove is in communication with the first through hole and extends in a direction intersecting with a direction in which the first through hole extends; and a shank including a second inner peripheral surface defining a second through hole that is in communication with the first through hole, wherein the shank further includes a second outer peripheral surface opposite to the second inner peripheral surface in a direction intersecting with a direction in which the second through hole extends, the second outer peripheral surface includes a screw thread, the head further includes a first outer peripheral surface opposite to the first inner peripheral surface in the direction intersecting with the direction in which the first through hole extends, the groove is in communication with a first opening provided in the first outer peripheral surface, the groove extends to and terminates at the first inner peripheral surface, and the first opening is defined by an edge including at least a first curved surface.

2. The fastener according to claim 1, wherein the head further includes a first end connected to the shank and a second end opposite to the first end in the direction in which the first through hole extends, and the groove is in communication with a second opening provided in the second end.

3. The fastener according to claim 2, wherein the second opening is defined by an edge including a second curved surface.

4. The fastener according to claim 1, wherein the shank further includes a third end connected to the head and a fourth end opposite to the third end in a direction in which the second through hole extends, and the second through hole is in communication with a third opening provided in the fourth end.

5. The fastener according to claim 4, wherein the third opening is defined by an edge including a third curved surface.

6. The fastener according to claim 1, wherein the head further includes an additional groove different from the groove.

7. the fastener according to claim 6, wherein the additional groove is in communication with the groove via the first through hole adjacent where the groove terminates at the first inner peripheral surface.

8. The fastener according to claim 1, wherein the head further includes a tool engagement portion.

9. The fastener according to claim 1, wherein
the head has a first maximum width in a direction intersecting with the direction in which the first through hole extends,
the shank has a second maximum width in a direction intersecting with the direction in which the second through hole extends, and
the second maximum width is smaller than the first maximum width.

10. A wiring assembly comprising:
the fastener according to claim 1; and
a linear member partially arranged in at least one of the first through hole and the second through hole.

11. The wiring assembly according to claim 10, wherein the linear member includes a wire.

12. The wiring assembly according to claim 10, wherein the fastener engages with a bicycle frame.

13. The wiring assembly according to claim 10, further comprising an intermediate member located between the head and the bicycle frame with the fastener engaged with the bicycle frame.

14. The wiring assembly according to claim 12, wherein the fastener fixes a bottle cage to the bicycle frame.

15. The wiring assembly according to claim 12, wherein the fastener is fixed to at least one of a down tube and a seat tube of the bicycle frame.

16. A fastener to be engaged with a bicycle, the fastener comprising:
a head including a first inner peripheral surface defining a first through hole;
a shank including a second inner peripheral surface and a second outer peripheral surface, wherein the second inner peripheral surface defines a second through hole that is in communication with the first through hole, the second outer peripheral surface is opposite to the second inner peripheral surface in a direction intersecting with a direction in which the second through hole extends, and the shank is connected to the head; and
a first electric terminal fixed to one of the first inner peripheral surface and the second inner peripheral surface,
wherein the second outer peripheral surface includes a screw head.

17. The fastener according to claim 16, wherein the first electric terminal is fixed to the first inner peripheral surface.

18. The fastener according to claim 17, wherein
the head further includes a first end connected to the shank and a second end opposite to the first end in a direction in which the first through hole extends, and
the first electric terminal is arranged on the second end.

19. The fastener according to claim 16, wherein the first electric terminal is fixed to the second inner peripheral surface.

20. The fastener according to claim 19, wherein
the shank further includes a third end connected to the head and a fourth end opposite to the third end in the direction in which the second through hole extends, and
the first electric terminal is arranged on the fourth end.

21. The fastener according to claim 16, further comprising a second electric terminal fixed to the other one of the first inner peripheral surface and the second inner peripheral surface.

22. A wiring assembly comprising:
a fastener comprising:
a head including a first inner peripheral surface and a groove, wherein the first inner peripheral surface defines a first through hole, and the groove is in communication with the first through hole and extends in a direction intersecting with a direction in which the first through hole extends, and
a shank including a second inner peripheral surface defining a second through hole that is in communication with the first through hole, wherein the shank is connected to the head; and
a linear member partially arranged in at least one of the first through hole and the second through hole, wherein
the fastener engages with a bicycle frame, and
the linear member is electrically connected to a wireless communication portion located outside the bicycle frame.

23. The wiring assembly according to claim 22, wherein the fastener fixes the wireless communication portion to the bicycle frame.

24. A fastener to be engaged with a bicycle, the fastener comprising:
a head including a first inner peripheral surface and a groove, wherein the first inner peripheral surface defines a first through hole, the groove is in communication with the first through hole and extends in a direction intersecting with a direction in which the first through hole extends, and the goove extends to and terminates at the first inner peripheral surface; and
a shank including a second inner peripheral surface defining a second through hole that is in communication with the first through hole, wherein
the shank further includes an end connected to the head and an additional end opposite to the end in a direction in which the second through hole extends, and the second through hole has a smaller diameter in the additional end than in the end.

\* \* \* \* \*